W. W. SIMRELL.
Car-Axle Box.
No. 36,033.
Patented July 29, 1862.
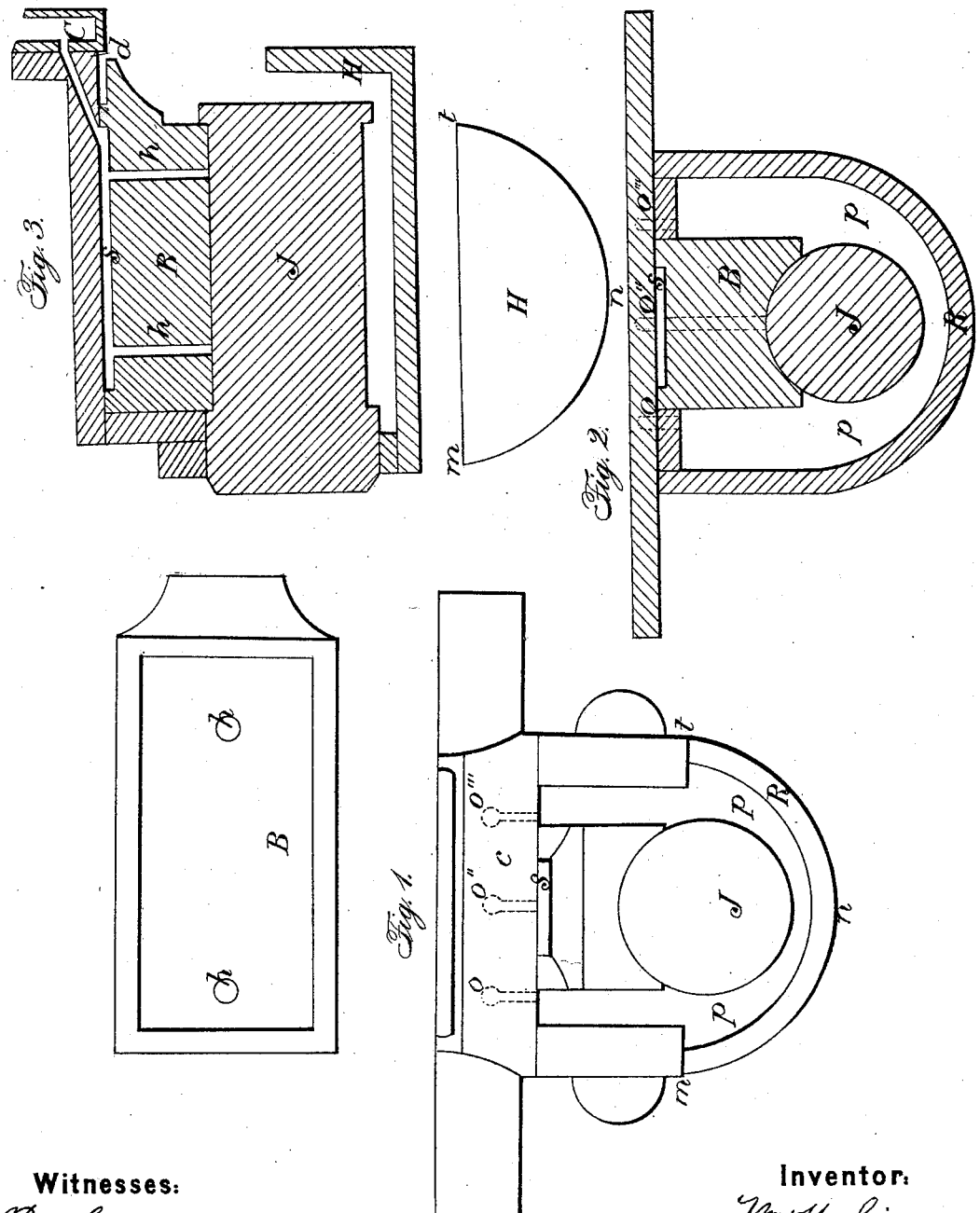
Witnesses:
R. Lobdell
N. DuBois
Inventor:
Wm. W. Simrell
By V. P. Corbett atty

UNITED STATES PATENT OFFICE.

WILLIAM W. SIMRELL, OF GREAT BEND, PENNSYLVANIA.

IMPROVEMENT IN AXLE-BOXES FOR RAILROAD-CARS.

Specificaton forming part of Letters Patent No. 36,033, dated July 29, 1862.

*To all whom it may concern:*

Be it known that I, WILLIAM W. SIMRELL, of Great Bend, in the county of Susquehanna and State of Pennsylvania, have invented certain new and useful Improvements in Axle-Boxes for Railroad-Cars; and I do hereby declare that the following is a full, clear, and exact description of the construction and operation of the same, reference being had to the annexed drawings, making a part of this specification, in which—

Figure 1 is a front view of the same; Fig. 2, a transverse section of the same, and Fig. 3 a longitudinal section of the same.

The nature of my invention consists in so constructing the axle-box of cars as to secure a more perfect application of the lubricating material to the journals of the axle.

In the following description similar letters refer to similar parts.

Fig. 1 shows the box with the cap H removed. J is the journal or end of the axle; $p\ p$, the space around the journal to be filled with the packing; C, the oil-cup, and $o\ o''\ o'''$ holes inside the cup, through which the oil is conducted to the packing. R is the rim of the box.

In Fig. 2 the block or support B is shown with the cavity $s$, into which the oil from the middle hole, $o''$, passes, and is distributed through the holes $h\ h$ in the support B upon the journal J. Through the two holes $o$ and $o'''$ the oil passes to the packing on each side of the journal. The orifice $d$ (shown in Fig. 3) conducts the oil from the middle hole, $o''$, to the top of the journal.

The space $p\ p$, which is to hold the packing, is widened at the sides of the journal and contracted on the under side of it. This prevents the packing from working under the journal, as is the case in those boxes that are made with the space around the journal of uniform dimensions. In the ordinary box the packing soon gets under the journal, leaving the sides exposed and liable to get dry, and the packing gets hard and shrinks away from the journal. In my improved box the packing remains closely to the sides and bottom, and is kept constantly saturated with the oil from the two side holes in the oil-cup.

I do not claim the invention of an axle-box inclosing a space around the journal to be filled with packing; but What I do claim as my invention, and desire to secure by Letters Patent, is—

The combination of the oil-cup C, with holes $o\ o''\ o'''$, with the support B upon journal J, with holes $h\ h$, when used for the purposes of lubricating the journal J when surrounded by the space $p\ p\ p$, widened at the sides of said journal and contracted under the same to keep the packing from shrinking away from the journal, in manner and for the purpose herein described.

WM. W. SIMRELL.

Witnesses:
WM. A. SNOW,
JEREMIAH HAYWARD.